United States Patent [19]

Kato et al.

[11] Patent Number: 4,701,295

[45] Date of Patent: Oct. 20, 1987

[54] METHOD OF FORMING BOTTOMED CYLINDRICAL BODIES FROM A CYLINDRICAL BODY OF THERMOPLASTIC RESIN

[75] Inventors: Nobuyuki Kato, Yokohama; Akira Kobayashi, Tokyo, both of Japan

[73] Assignee: Toyo Seikan Kaisha, Ltd., Tokyo, Japan

[21] Appl. No.: 749,844

[22] Filed: Jun. 28, 1985

[30] Foreign Application Priority Data

Jul. 5, 1984 [JP] Japan ................................ 59-138019

[51] Int. Cl.$^4$ ..................... B29B 13/02; B29C 51/10; B29C 57/10

[52] U.S. Cl. ..................................... 264/519; 264/159; 264/163; 264/296; 264/322; 264/521; 264/571; 425/302.1; 425/305.1

[58] Field of Search ............... 264/521, 571, 150, 159, 264/296, 322, 163, 519; 425/302.1, 305.1

[56] References Cited

U.S. PATENT DOCUMENTS

| 647,993 | 4/1900 | Schmidt | 264/296 X |
|---|---|---|---|
| 1,537,860 | 5/1925 | Miller | 264/159 X |
| 2,426,060 | 8/1947 | Seybold | 93/36.5 |
| 2,503,171 | 4/1950 | Posner | 264/159 |
| 3,408,439 | 10/1968 | Prohaska | 264/294 |
| 3,456,289 | 7/1969 | Kirchner | 18/1 |
| 3,509,252 | 4/1970 | Baehr | 264/322 X |
| 4,032,281 | 6/1977 | Rakovsky | 425/392 |
| 4,379,115 | 4/1983 | Seach et al. | 264/296 |
| 4,380,525 | 4/1983 | Jakobsen et al. | 264/521 |
| 4,424,182 | 1/1984 | Cerny | 264/322 X |
| 4,464,106 | 8/1984 | Jakobsen et al. | 425/525 |

FOREIGN PATENT DOCUMENTS

| 2020198 | 11/1971 | Fed. Rep. of Germany | 264/322 |
|---|---|---|---|
| 2252091 | 5/1974 | Fed. Rep. of Germany | . |
| 3133254 | 3/1983 | Fed. Rep. of Germany | 264/159 |
| 55-77535 | 6/1980 | Japan | 264/571 |
| 0244221 | 4/1941 | Switzerland | . |
| 587603 | 5/1947 | United Kingdom | . |

Primary Examiner—Jan H. Silbaugh
Assistant Examiner—Hubert C. Lorin
Attorney, Agent, or Firm—Beveridge, DeGrandi & Weilacher

[57] ABSTRACT

A method of forming bottomed cylindrical bodies, which can be used conveniently as preforms for the production of containers by stretch blow-molding, etc., from a cylindrical body of thermoplastic resin. The method includes a softening step of heat-softening an axially intermediate part of the cylindrical body, a necking step of necking the axially intermediate part of the cylindrical body radially inwardly, said necking step being carried out subsequently to, or simultaneously with, the softening step, a cutting step of cutting the axially intermediate part of the cylindrical body necked radially inwardly in the necking step, thereby to divide the cylindrical body into two members, and a fusing step of heat-melting the cut end portion of each of the two members and fusing the cut end portion.

3 Claims, 8 Drawing Figures

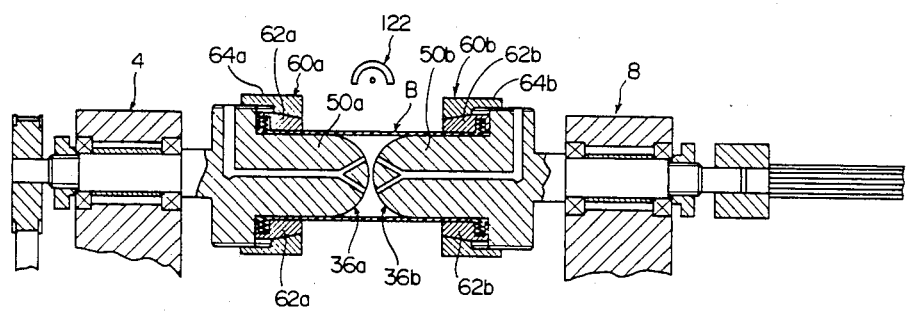
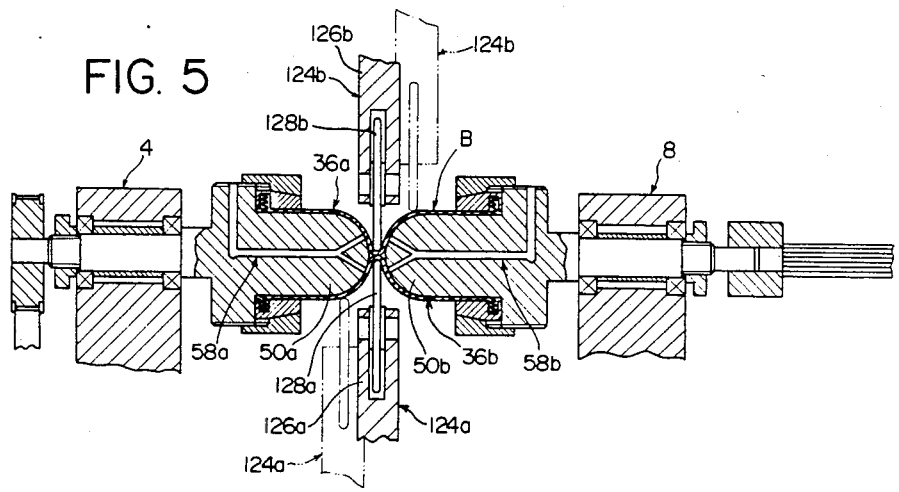

4,701,295

METHOD OF FORMING BOTTOMED CYLINDRICAL BODIES FROM A CYLINDRICAL BODY OF THERMOPLASTIC RESIN

BACKGROUND OF THE INVENTION

1. Field of the Invention

This invention relates to a method of forming bottomed cylindrical bodies from a cylindrical body of thermoplastic resin. The bottomed cylindrical body can be directly used as a container, but can be conveniently used as a preform for producing a final desired container by a molding technique known per se, such as stretch blow-molding.

2. Description of the Prior Art

In recent years, mono-or multilayer containers of thermoplastic resin have gained widespread acceptance in place of glass or metallic containers for holding various articles such as foods and drinks and detergent liquids. Such containers are generally produced by forming a preform in the form of a bottomed cylindrical body from a thermoplastic resin stock, and then stretch blow-molding the preform.

The preform is most generally produced by an injection molding method. There has also been proposed and gained commercial acceptance a molding method, called an extrusion pipe method, which comprises forming a pipe with both ends open, i.e. a cylindrical body, by extrusion molding, thereafter cutting the pipe to a predetermined length, and deforming one end portion of the pipe to form a bottomed cylindrical body. This method is described, for example, in "Molding Apparatus and Techniques for PET Bottles" at pages 86–94 of "Plastics Age", October 1982 (published by Plastics Age Co., Ltd.). As described in this publication, the extrusion pipe method has various advantages over the injection molding method. But the conventional extrusion pipe method has the following problems or defects which have to be overcome.

According to the conventional extrusion pipe method, when the cylindrical body having both open ends is converted to a bottomed cylindrical body by deforming its one end portion, the one end portion of the cylindrical body is heat-melted, and simultaneously with, or subsequently to, the melting, the one end portion in the molten state is directly deformed into the desired bottom shape by an inside press mold and an outside press mold. Experiences of the present inventors, however, tell that when this method is used to form the bottomed cylindrical body, so-called neck wrinkles occur at the bottom portion deformed to the required shape, and lead to a lack of thickness uniformity and aesthetic beauty in a final container molded from the bottomed cylindrical body, and that when the cylindrical body is of a laminated structure composed of multiple thermoplastic resin layers, the laminated structure is considerably disordered in the aforesaid bottom portion and this portion becomes defective both in strength and in performance.

SUMMARY OF THE INVENTION

It is a primary object of this invention to provide a novel and excellent method of forming a bottomed cylindrical body, which can be conveniently used, for example, as a preform for producing a final desired container by stretch blow-molding, etc., from a cylindrical body of thermoplastic resin, by which even when the cylindrical body is of a laminated structure having multiple thermoplastic resin layers, the occurrence of neck wrinkles and the disordering of the laminated structure at the bottom portion of the bottomed cylindrical body can be sufficiently avoided or suppressed.

Other objects of this invention will become apparent from the following description of one specific embodiment of the method of this invention taken in conjunction of the accompanying drawings.

Extensive investigations of the present inventors have led to the discovery that by employing a unique method which comprises heat-softening an axially intermediate part of a cylindrical body, necking the intermediate part radially inwardly, cutting the necked intermediate part to divide the cylindrical body into two members, and heat-melting and fusing the cut end portion of each of the two members to form two bottomed cylindrical bodies from one cylindrical body, the occurrence of so-called neck wrinkles and the disordering of the laminated structure at the bottom portion of the bottomed cylindrical body can be fully avoided or suppressed and the desired good bottomed cylindrical body can be obtained even when the cylindrical body is of a laminated structure having multiple thermoplastic resin layers.

According to this invention, there is provided a method of forming a bottomed cylindrical body from a cylindrical body of thermoplastic resin, which comprises a softening step of heat-softening an axially intermediate part of the cylindrical body, a necking step of necking the axially intermediate part of the cylindrical body radially inwardly, said necking step being carried out subsequently to, or simultaneously with, the softening step, a cutting step of cutting the axially intermediate part of the cylindrical body necked radially inwardly in the necking step, thereby to divide the cylindrical body into two members, and a fusing step of heat-melting the cut end portion of each of the two members and fusing the cut end portion.

It is preferred that in the necking step, a tension acting axially on the axially intermediate part be adjusted within the desired range by relatively moving both end portions of the cylindrical body in the axial direction.

BRIEF DESCRIPTION OF THE DRAWINGS

FIG. 4, 5, 6, 7 and 8 are simplified sectional views showing the various steps of one embodiment of the method of this invention.

DETAILED DESCRIPTION OF PREFERRED EMBODIMENTS

One embodiment of the method of this invention will be described in detail with reference to the accompanying drawings.

Figure 1:
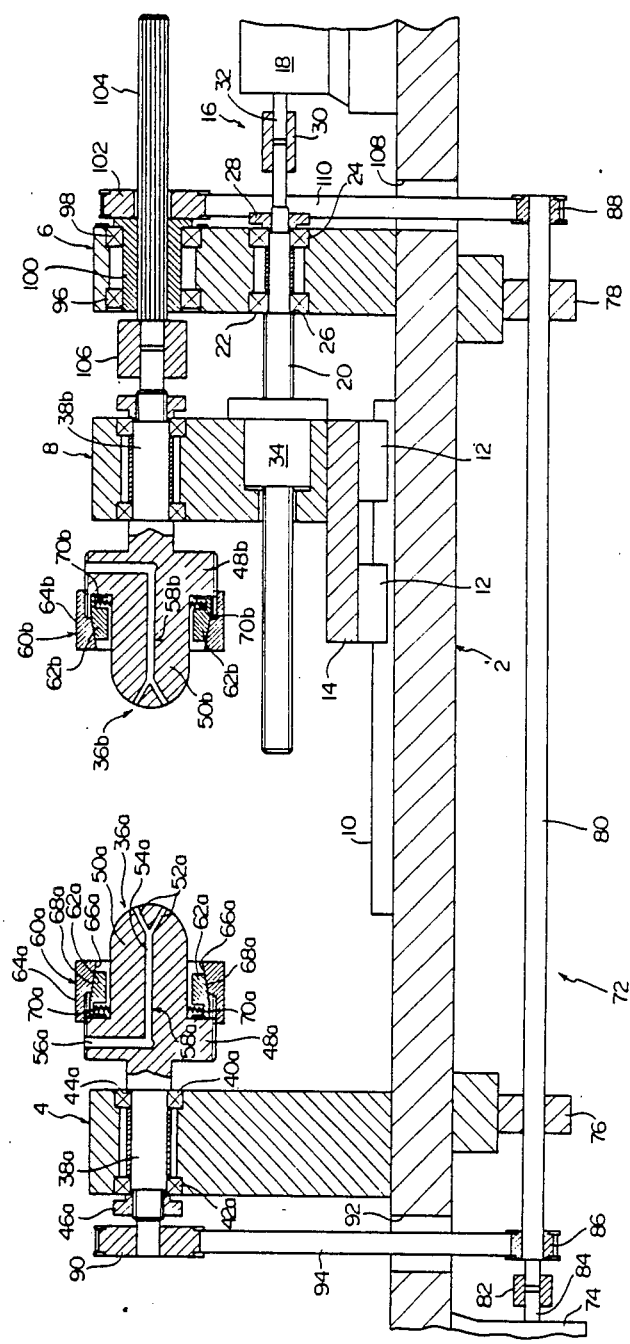
FIG. 1 is a simplified sectional view showing one example of a molding apparatus which can be conveniently used in one embodiment of the method of this invention.

FIG. 1 shows one example of a molding apparatus which can be conveniently used in one embodiment of the method of this invention. The illustrated molding apparatus includes a base stand 2 supported at a predetermined position by a suitable supporting structure (not shown). Stationary supporting blocks 4 and 6 are fixed to the upper surface of the base stand 2 which extends substantially horizontally. A movable supporting block 18 located between the stationary supporting blocks 4 and 6 is disposed on the upper surface of the base stand 2. A guide rail 10 extending in the left-right direction in FIG. 1 is fixed to the upper surface of the base stand 2. A movable plate 14 is mounted on the guide rail 10 through linear bearings 12 in such a manner as to move freely along the guide rail 10. The movable supporting block 8 is fixed to the movable plate 14, and consequently, the movable supporting block 8 is mounted on the base stand 2 such that it can move freely in the left-right direction in FIG. 1 along the guide rail 10.

Also disposed on the base stand 2 is a moving means 16 for moving the movable supporting block B along the guide rail 10. The moving means 16 includes a rotating driving source 18 which may be an electric motor fixed to the base stand 2, and a rotating shaft 20 extending substantially horizontally through the stationary supporting block 6 and the movable supporting block 8. The rotating shaft 20 is rotatably mounted on the stationary supporting block 6 by bearing members 22 and 24. The movement of the rotating shaft 20 in the left-right direction in FIG. 1 is surely hampered by the abutting of a shoulder portion 26 formed in the rotating shaft 20 against the left side surface of the hearing member 22 and the abutting of a check nut 28 fitted around the rotating shaft 20 against the right side surface of the bearing member 24. The input end of the rotating shaft 20, i.e. the right end in FIG. 1, is connected to an output shaft 32 of the driving source 18 by a suitable connecting means 30. On the other hand, an external thread is formed in that part of the rotating shaft 20 which extends through the movable supporting block 8, or more specifically that part of the rotating shaft 20 which is left of the shoulder portion 26 in FIG. 1. An internal thread formed in a ball nut 34 fixed to the movable supporting block 8 is engaged with the external thread. Thus, when the rotating shaft 20 is rotated in a predetermined direction by energizing the driving source 18, the movable supporting block 8 is moved to the left in FIG. 1 along the guide rail 10. When the rotating shaft 20 is rotated in a reverse direction, the movable supporting block 8 is moved to the right in FIG. 1.

A mandrel means shown generally at 36a is rotatably mounted on the stationary supporting block 4. The mandrel means 36a has a shaft portion 38a extending rearwardly (to the left in FIG. 1), and the shaft portion 38a is rotatably mounted on the stationary supporting block 4 by bearing members 40a and 42a. The movement of the mandrel means 36a in the left-right direction in FIG. 1 is surely hampered by the abutting of a shoulder portion 44a formed in the shaft portion 38a against the right side surface of the bearing member 40a and the abutting of a check nut 46a fitted around the shaft portion 38a against the left side surface of the bearing member 42a. A cylindrical base portion 48a having a relatively large diameter and a cylindrical mandrel portion 50a having a relatively small diameter projecting forwardly from the base portion 48a are formed in the front portion (the right end portion in FIG. 1) of the mandrel means 36a. The end of the mandrel portion 50a is formed in a hemispherical shape. In the mandrel portion 50a and the base portion 48a is formed a ventilation hole 58a comprised of a plurality of (for example, three) inclined holes 52a extending rearwardly and slightly inclinedly from their open ends located near the forward end of the mandrel portion 50a, a horizontal hole 54a extending axially rearwardly and substantially horizontally from the point of meeting of the inclined holes 52a, and a radial hole 56a extending radially in the base portion 48a from the rear end of the horizontal hole 54a and opening on the circumferential surface of the base portion 48a. A chuck means 60a is further mounted on the mandrel portion 50a and the base portion 48a. The chuck means 60a includes a plurality of (for example, four) arcuate holding pieces 62a arranged around the rear end portion of the madrel portion 50a, and a clamping ring 64a surrounding the arcuate holding pieces 62a. An external thread is formed on the peripheral surface of the base portion 48a, and an internal thread is formed in the rear portion of the inner circumferential surface of the clamping ring 64a. By engaging the internal thread with the external thread, the clamping ring 64a is threadedly secured to the base portion 48a. The front portion of the inner circumferential surface of the clamping ring 64a is formed as a tapered surface 66a having its inside diameter progressively decreasing forwardly. The front portion of the peripheral surface of each holding piece 62a is formed as a tapered surface 68a whose outside diameter progressively decreases forwardly correspondingly to the above tapered surface 66a. An elastic means 70a which may be a compression coil spring is disposed between the rear portion of each holding piece 62a and the mandrel portion 50a. The elastic means 70a elastically biases the holding piece 62a radially outwardly and presses the tapered surface 68a against the tapered surface 66a. When in the above chuck means 60a, the clamping ring 64a is moved forwardly with respect to the base portion 48a by rotating it in a predetermined direction, the holding pieces 62a are correspondingly moved radially outwardly by the elastic biasing action of the elastic means 70a, and consequently, the distance between the outer circumferential surface of the mandrel portion 50a and the inner circumferential surface of the holding piece 62a is increased. When the clamping ring 64a is rotated in a reverse direction to move it rearwardly with respect to the base portion 48a, the tapered surface 66a acts on the tapered surface 68a, and the holding piece 62a is moved radially inwardly against the elastic biasing action of the elastic means 70a. Consequently, the distance between the outer circumferential surface of the mandrel portion 50a and the inner circumferential surface of the holding piece 62a is decreased.

Corresponding to the mandrel 36a mounted on the stationary supporting block 4, a mandrel means 36b is mounted rotatably on the movable supporting block 8. Since the structure of the mandrel means 36b, and the method of its mounting on the movable supporting block 8 are substantially the same as the structure of the mandrel means 36a and the method of its mounting on the stationary supporting block 4 described above, a description of these will be omitted herein.

The illustrated molding apparatus further includes a rotating means 72 for rotating the mandrel means 36a and 36b. The rotating means 72 includes a rotating driving source 74 which may be an electric motor fixed to the under surface of the base stand 2, and a rotating shaft 80 mounted rotatably by bearing members 76 and 78 and extending substantially horizontally below the base stand 2. The input end (the left end in FIG. 1) of the rotating shaft 80 is connected to the output shaft 84 of the driving source 74 by a suitable connecting means 82. Timing pulleys 86 and 88 are fixed respectively to the left end portion and the right end of the rotating shaft 80. On the other hand, a timing pulley 90 is fixed to the free end of the shaft portion 38a of the mandrel means 36a, and an endless timing belt 94 extending through an opening 92 formed in the base stand 2 is wrapped about the timing pulleys 86 and 90. As a result, the mandrel means 36a is drivingly connected to the driving source 74 through the timing pulley 90, the timing belt 94, the timing pulley 86 and the rotating shaft 80. On the other hand, with regard to the stationary supporting block 6, a sleeve member 100 is mounted on the stationary supporting block 6 by bearing members 96 and 98 in such a manner that it is rotatable and does not move axially. A timing pulley 102 is fixed to the right side surface of the sleeve member 100, and a spline shaft 104 extending through the sleeve member 100 and the timing pulley 102 is provided. A spline adapted to be engaged with the spline formed on the peripheral surface of the spline shaft 104 is formed in the inner circumferential surface of the sleeve member 100. Thus, the spline shaft 104 rotates together with the sleeve member 100 and the timing pulley 102, but can freely move in the axial direction (the left-right direction in FIG. 1) with respect to the sleeve member 100 and the timing pulley 102. The left end of the spline shaft 104 is connected to the free end of the shaft portion 38b of the mandrel means 36b by a suitable connecting means 106. On the other hand, a timing belt 110 extending through an opening 108 formed in the base stand 2 is wrapped about the timing pulley 102 fixed to the sleeve member 100 and the timing pulley 88 fixed to the rotating shaft 80. As a result, the mandrel means 36b is drivingly connected to the driving source 74 through the spline shaft 104, the sleeve member 100, the timing pulley 102, the timing belt 110, the timing pulley 88, and the rotating shaft 80.

One specific embodiment of the method of this invention which forms two bottomed cylindrical bodies from one cylindrical body by using the molding apparatus described above will be described.

Figure 2:
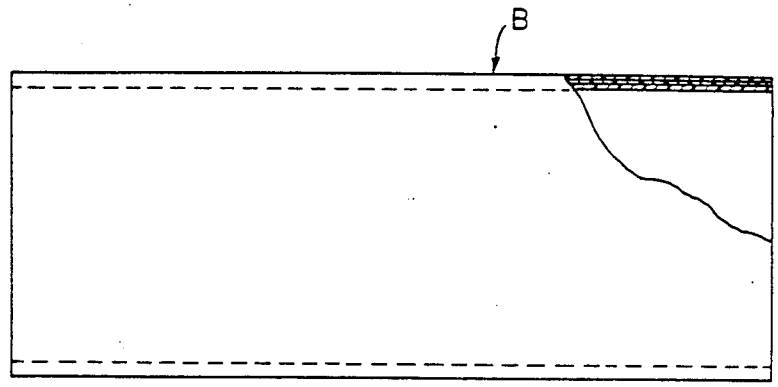
FIG. 2 is a front elevation, partly in section, of a cylindrical body as a molding material.
Figure 3:
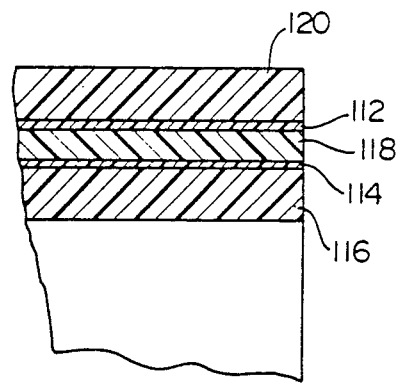
FIG. 3 is a sectional view showing the laminated structure of the cylindrical body shown in FIG. 2.

A cylindrical body B having both open ends as shown in FIG. 2 is used as a molding material in the method of this invention. The cylindrical body B can be conveniently prepared by forming a relatively long pipe, or a cylindrical body, by an extrusion molding method known per se, and then cutting the extruded cylindrical body to a required length. The cylindrical body B may be of a single layer structure composed of a single layer of a suitable thermoplastic resin such as polypropylene and polyethylene terephthalate, or of a laminated structure composed of a plurality of layers of thermoplastic resin. One example of the laminated structure is shown in FIG. 3. The laminated structure shown in FIG. 3 has an inner layer 116, an interlayer 118 and an outer layer 120 bonded to each other by suitable adhesive layers 112 and 114. The inner layer 116 and the outer layer 120 may be composed of a suitable thermoplastic resin such as polypropylene or polyethylene terephthalate. The interlayer 118 is desirably composed of a thermoplastic resin having excellent gas-barrier property, such as a saponification product of an ethylene/vinyl acetate copolymer, a vinylidene chloride resin, or a polyamide resin.

The cylindrical body B as a molding material is mounted on, and held by, the mandrel means 36a and 36b as shown in FIG. 4. More specifically, the cylindrical body B is mounted on the mandrel means 36a and 36b so as to stride over the mandrel portions 50a and 50b. By energizing the driving source 18 (FIG. 1), the movable supporting block 8 and the mandrel means 36b mounted on it are moved to the left in FIG. 1 to create the condition illustrated in FIG. 4. In the condition shown in FIG. 4, the left end portion of the cylindrical body B is positioned between the rear end portion of the mandrel portion 50a and the holding piece 62a in the mandrel means 36a, and the right end portion of the cylindrical body B is positioned between the rear end portion of the mandrel portion 50b and the holding piece 62b in the mandrel means 36b. Thereafter, the clamping rings 64a and 64b in the mandrel means 36a and 36b are manually rotated to move the holding pieces 62a and 62b radially inwardly. Consequently, the two end portions of the cylindrical body B are held sufficiently firmly by the mandrel portions 50a and 50b and the holding pieces 62a and 62b.

An axially intermediate part of the cylindrical body B is then heated to a suitable temperature (which may be 60° to 110° C. for polyethylene terephthalate) to soften it. The heat-softening can be conveniently carried out by positioning a suitable heater 122 such as a radiating-type quartz lamp heater or a hot air heater in proximity to the circumferential surface of the axially intermediate portion of the cylindrical body B as shown in FIG. 4, and energizing the driving source 74 to rotate the mandrel means 36a and 36b in a predetermined direction, and therefore, rotate the cylindrical body B in a predetermined direction.

Subsequently to, or simultaneously with, the heat-softening, the heat-softened axially intermediate part of the cylindrical body B is necked radially inwardly along the hemispherical front end surfaces of the mandrel portions 50a and 50b in the mandrel means 36a and 36b. The necking operation can be conveniently carried out as shown in FIG. 5. Specifically, the cylindrical body B is rotated in a predetermined direction by energizing the driving source 74 (FIG. 1). A pair of necking roll assemblies 124a and 124b are caused to act on the axially intermediate part of the cylindrical body B. Each of the necking roll assemblies 124a and 124b includes a movable supporting frame 126a or 126b and a necking roll 128a or 128b rotatably mounted on the movable supporting frame 126a or 126b. The necking roll assembly 124a is moved arcuately along the forward end surface of the mandrel portion 50a by a suitable moving mechanism (not shown) from the position shown by a two-dot chain line in FIG. 5 to the position shown by a solid line in FIG. 5, and consequently, by the action of the necking roll 128a, the left half of the axially intermediate part of the cylindrical body B is necked along the forward end surface of the mandrel portion 50a. The necking roll assembly 124b is moved arcuately along the forward end surface of the mandrel portion 50b by a suitable moving mechanism (not shown) from the position shown by a two-dot chain line in FIG. 5 to the position shown by a solid line in FIG. 5, and consequently, the right half of the axially intermediate part of the cylindrical body B is necked along the forward end surface of the mandrel portion 50b by the action of the necking roll 128b. If desired, instead of allowing the ventilation holes 58a and 58b formed in the mandrel means 36a and 36b to function merely as air vents, it is possible in the necking operation to cause the ventilation holes 58a and 58b to communicate with a vacuum source (not shown) through suitable communicating means (not shown), and to maintain the inside of the axially intermediate part of the cylindrical body B under reduced pressure, whereby the necking operation can be promoted by the atmospheric pressure acting on the outside surface of the axially intermediate part of the cylindrical body B.

The experimental work of the present inventors has shown that if a tension acting axially on the axially intermediate part of the cylindrical body B during the necking operation is within a proper range, even a cylindrical body B having a laminated structure composed of a plurality of thermoplastic resin layers can be necked at its axially intermediate part without the occurrence of wrinkles in the necked part and without disordering the laminated structure of the necked part. The axial tension on the axially intermediate part of the cylindrical body can be properly adjusted by relatively moving the two end portions of the cylindrical body B as required. More specifically, at the time of the necking operation described above, the axial tension on the axially intermediate part of the cylindrical body B can be increased by energizing the driving source 18 and moving the mandrel means 36b properly to the right in FIG. 5. Alternatively, the axial tension on the axially intermediate part of the cylindrical body B can be decreased by energizing the driving source 18 (FIG. 1) and moving the mandrel means 36b properly to the left in FIG. 5.

Figure 6:
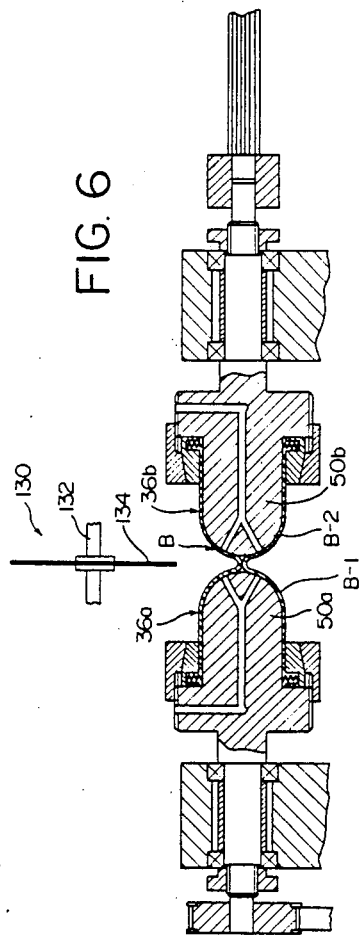
Figure 7:
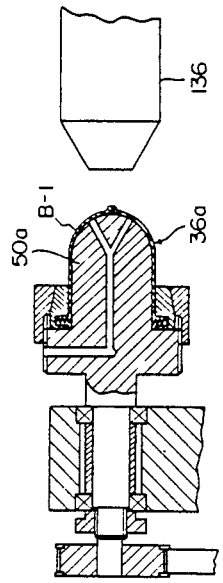
Figure 8:
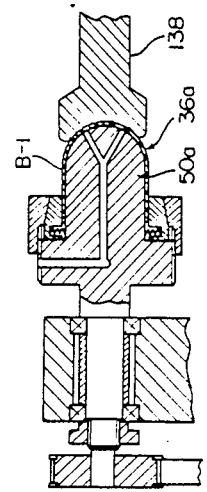

After the necking, the boundary between the left half of the axially intermediate part of the cylindrical body B which has been necked along the forward end portion of the mandrel portion 50a and its right half necked along the forward end portion of the mandrel portion 50b is cut to divide the cylindrical body into two members B-1 and B-2 (see FIGS. 6 and 7). The cutting operation can be conveniently carried out by using a rotating cutter assembly 130 shown in FIG. 6. The cutter assembly 130 includes a rotating shaft 132 and a disc-like cutter 134 fixed to it. The rotating shaft 132 is supported rotatably and vertically movably. In cutting, a driving source (not shown) which may be an electric motor is energized to rotate the rotating shaft 132 and the cutter 134 fixed to it in a predetermined direction, and also caused to descend from the position shown in the drawing. As a result, the rotating cutter 134 acts on the aforesaid boundary in the axially intermediate part of the cylindrical body B. During the cutting operation, it is not always necessary to rotate the mandrel means 36a and 36b, and therefore the cylindrical body B.

Thereafter, the cut end portion of each of the two members B-1 and B-2 is heated to a temperature above the melting point of the resin to melt and fuse it. The heat-melting of the cut end portion can be conveniently carried out by positioning a suitable heater 136 such as a radiating-type quartz lamp heater or a hot air heater opposite to the cut end portion of the member B-1 (or B-2) as shown in FIG. 7. Preferably, at the time of heat-melting, the mandrel means 36a (and 36b), and therefore the members B-1 (and B-2), are rotated so as to heat the cut end portions of the members B-1 (and B-2) sufficiently uniformly.

It is preferred that subsequently to, or simultaneously with, the heat melting, an inside press mold and an outside press mold of predetermined shapes are pressed against the inner surface and outer surface of the cut end portion of the member B-1 (or B-2) to form the molten cut end portion into a desired shape and fuse it. With reference to Figure B, in the illustrated embodiment, the mandrel portions 50a (and 50b) of the mandrel means 36a (and 36b) are directly used as inside press molds, and an outside press mold 138 having at its front end a hemispherical concave surface corresponding to the hemispherical forward end surface of the mandrel portion 50a (or 50b) is pressed against the outside surface of the cut end portion in the molten state. Thus, the cut end portion is shaped along the hemispherical forward end surface of the mandrel portion 50a (or 50b) and fused.

The two bottomed cylindrical bodies formed as described above can directly be utilized as containers. Conveniently, however, they are used as preforms for molding into containers of the desired shape by stretch blow-molding which is known per se. When the bottomed cylindrical bodies are used as performs, the open end portions of the bottomed cylindrical bodies may be subjected to so-called neck molding by a known method before they are stretch blow-molded.

While the method of this invention has been described above with reference to one embodiment in conjunction with the accompanying drawings, it should be understood that the invention is not limited to this specific embodiment, and various changes and modifications are possible without departing from the scope of the invention.

What is claimed is:

1. A method of forming bottomed cylindrical bodies from a cylindrical body of thermoplastic resin, which comprises
    a softening step of heat-softening an axially intermediate part of the cylindrical body,
    a necking step of necking the axially intermediate part of the cylinderical body radially inwardly with a necking tool, said necking step being carried out subsequently to, or simultaneously with, the softening step, said cylindrical body being supported on and being rotated with two mandrels during the necking step, said mandrels having end portions of predetermined shapes and located opposite to each other inside the axially intermediate part of the cylindrical body, said necking step being performed by two necking means which are moved radially inwardly and axially toward each other along end portions of the mandrels,
    a tension adjusting step of moving the mandrels axially during the necking step to move the end portions of the cylindrical body relative to each other to adjust the tension acting axially on the axially intermediate part of the cylindrical body,
    a cutting step of cutting the axially intermediate part of the cylindrical body necked radially inwardly in the necking step, thereby to divide the cylindrical body into two members, and
    a fusing step of heat-melting the cut end portion of each of the two members and fusing the cut end portion.

2. The method of claim 1 wherein in the necking step, the inside of the axially intermediate part of the cylindrical body is maintained under reduced pressure.

3. The method of claim 1 wherein in the fusing step, an inside press mold and an outside press mold of predetermined shapes are pressed against the inside surface and outside surface of the cut end portion of each of the two members either simultaneously with, or subsequently to, the heat-melting of the cut end portion.

* * * * *